United States Patent [19]

Crane

[11] Patent Number: 5,758,692
[45] Date of Patent: Jun. 2, 1998

[54] ORIFICE FITTING

[75] Inventor: Dreu E. Crane, Broken Arrow, Okla.

[73] Assignee: Crane Manufacturing, Inc., Tulsa, Okla.

[21] Appl. No.: 613,907

[22] Filed: Mar. 11, 1996

Related U.S. Application Data

[63] Continuation-in-part of Ser. No. 404,516, Mar. 15, 1995, Pat. No. 5,588,467.

[51] Int. Cl.$^6$ ........................................... F15D 1/00
[52] U.S. Cl. ........................................... 138/44; 138/94
[58] Field of Search ........................... 138/94, 94.3, 44, 138/45

[56] References Cited

U.S. PATENT DOCUMENTS

| | | |
|---|---|---|
| 1,273,597 | 7/1918 | Fisher . |
| 1,808,715 | 6/1931 | Reynolds . |
| 1,924,125 | 8/1933 | Linderman, Jr. . |
| 1,980,699 | 11/1934 | Robinson . |
| 1,996,192 | 4/1935 | Daniel . |
| 2,014,682 | 9/1935 | Greene . |
| 2,050,544 | 8/1936 | Robinson et al. . |
| 2,585,290 | 2/1952 | Walker . |
| 2,842,962 | 7/1958 | Dall ................................ 138/44 |
| 3,209,779 | 10/1965 | McGowen, Jr. ................. 138/44 |
| 3,817,287 | 6/1974 | Aitken . |
| 4,014,366 | 3/1977 | Critendon . |
| 4,370,893 | 2/1983 | Combes . |
| 4,393,722 | 7/1983 | Scott . |
| 4,399,708 | 8/1983 | Van Scoy . |
| 4,413,532 | 11/1983 | Van Scoy . |
| 4,422,339 | 12/1983 | Gall et al. . |
| 4,425,806 | 1/1984 | Van Scoy . |
| 4,452,278 | 6/1984 | Quinn ............................. 138/44 |
| 4,476,730 | 10/1984 | Brumm ........................... 138/94 |
| 4,478,251 | 10/1984 | Sanchez et al. . |
| 4,593,915 | 6/1986 | Seger et al. . |
| 5,042,531 | 8/1991 | Foster et al. . |
| 5,050,842 | 9/1991 | Foster et al. . |
| 5,094,272 | 3/1992 | Foster et al. . |
| 5,181,542 | 1/1993 | Wass et al. . |
| 5,305,796 | 4/1994 | Klak . |
| 5,327,938 | 7/1994 | Crane . |
| 5,327,941 | 7/1994 | Bitsakis et al. . |
| 5,538,344 | 7/1996 | Dybdahl ......................... 138/44 |

OTHER PUBLICATIONS

Berger, B. and Anderson, K., "Gas Handling and Field Processing," PennWell Books, Jan. 1980, pp. 119–127.

*Primary Examiner*—David Scherbel
*Assistant Examiner*—James F. Hook
*Attorney, Agent, or Firm*—Head, Johnson & Kachigian

[57] ABSTRACT

An orifice fitting for measuring fluid flow therethrough which can be used for either single or dual chamber fittings. The orifice fitting includes a plate carrier having an orifice plate receivable in the plate carrier. The orifice plate has a single preferred fluid flow direction. A double circular shoulder in the plate carrier includes a first shoulder and a concentric second shoulder having a larger diameter than the first shoulder. The double shoulder mates with a circular recess on the orifice plate to properly orient the plate for the preferred fluid flow direction.

3 Claims, 6 Drawing Sheets

5,758,692

ORIFICE FITTING

CROSS REFERENCE OF APPLICATION

This application is a continuation-in-part application of U.S. patent application Ser. No. 08/404,516, filed Mar. 15, 1995, now U.S. Pat. No. 5,588,467 entitled ORIFICE FITTING.

BACKGROUND OF THE INVENTION

1. Field of the Invention.

The present invention is directed to an orifice fitting for measurement of fluid flow wherein a plate carrier will receive either a standard cylindrical orifice plate or an unidirectional orifice plate having an extending circular lip.

2. Prior Art.

While fluid may be measured with various types of meters such as positive displacement meters, turbine meters, and venturi meters, orifice meters are widely used in the field and in pipeline systems.

Fluid flowing through a pipe can be measured by placing a constriction, such as an orifice plate, in the line to cause a pressure drop as it flows through the orifice plate. There is a direct relationship between the amount of this pressure drop, called the differential pressure, and the rate of flow.

Extensive use is made of orifice fittings of various types. The inlet side of the fitting is connected to the upstream section of pipe, while the outlet side is connected to the downstream section.

Two types of orifice fittings are commonly employed. The junior or "simplex" fitting has a single orifice chamber wherein the orifice plate is mounted in place in the flow path of the pipeline. In order to remove the orifice plate for maintenance or servicing, the fluid pressure in the pipeline must be removed so that the fitting can be disassembled. In the second type of orifice fitting, a senior or "duplex" fitting, two separate chambers are provided, one lower chamber to hold the orifice plate in position for passage of fluid through the pipeline and a second upper chamber wherein access is provided for service and maintenance. A valve is typically provided to separate the compartments from each other. As an example, see Critendon U.S. Pat. No. 4,014,366, for a device to convert a junior fitting to a senior fitting.

There is a need, therefore, to provide an orifice fitting wherein access may be had to both the orifice plate and the various carrier plate seals without interrupting fluid flow through the lower chamber and without disabling the fitting.

It is also desirable to provide an orifice fitting which provides access to both sides of the carrier plate.

The horizontal and vertical alignment of the orifice opening in the orifice plate with the tube or pipeline is critical both for accuracy of flow measurement and because of regulations, such as American Petroleum Institute regulations. An example of a mechanism to concentrically align the orifice is shown in Crane, U.S. Pat. No. 5,327,938 and Klak, U.S. Pat. No. 5,305,796.

It is, therefore, also desirable to provide an orifice fitting to provide concentric alignment of the orifice and orifice plate when in the lower chamber.

It is also desirable to provide an orifice fitting that may be raised out of the fluid flow path or lowered into the fluid flow path through a motorized mechanism.

Fluid in the system is often under considerable pressure and care must be taken to observe precautions.

It is also desirable to provide an orifice plate fitting wherein inspection and maintenance may be performed on the orifice plate after determining and confirming that the upper chamber is not pressurized.

It is also desirable to provide an orifice fitting with the ability to verify that no fluids bypass around the 0-rings of the carrier.

The teachings of the present invention may also be employed in a gate valve. A plate may be lowered into or out of the fluid flow path.

It is desirable to provide a gate valve having a full bore that will allow flow therethrough without any restriction in flow.

It is also desirable to provide a gate valve wherein access is provided to the plate without disabling the valve.

The orifice plate opening has evolved over the years so that, today, orifice plates often utilize openings with chamfered or beveled edges or quadrant, radiused edges on their inlet side. While these plates provide enhanced accuracy in measurement of fluid flow, they must be installed in the proper orientation.

Measurement orifice plates are replaced frequently by field personnel. If the orifice plate is installed backwards, it would not be detectable from the exterior. Installing the orifice plate backwards will effect the fluid flow and negatively influence the accuracy of the fluid measurement. An error of 155 to 17% would not be uncommon.

Accordingly, it is a principal object and purpose of the present invention to provide an orifice fitting that will accept either a standard, existing orifice plate or a unidirectional plate suggested by the present invention.

It is a further object and purpose of the present invention to provide a carrier plate that can only be installed in a preferred fluid flow direction.

It is a further object and purpose of the present invention to provide a unidirectional orifice plate for either a single or a dual chamber orifice fitting.

DETAILED DESCRIPTION OF THE PREFERRED EMBODIMENTS

Figure 1:
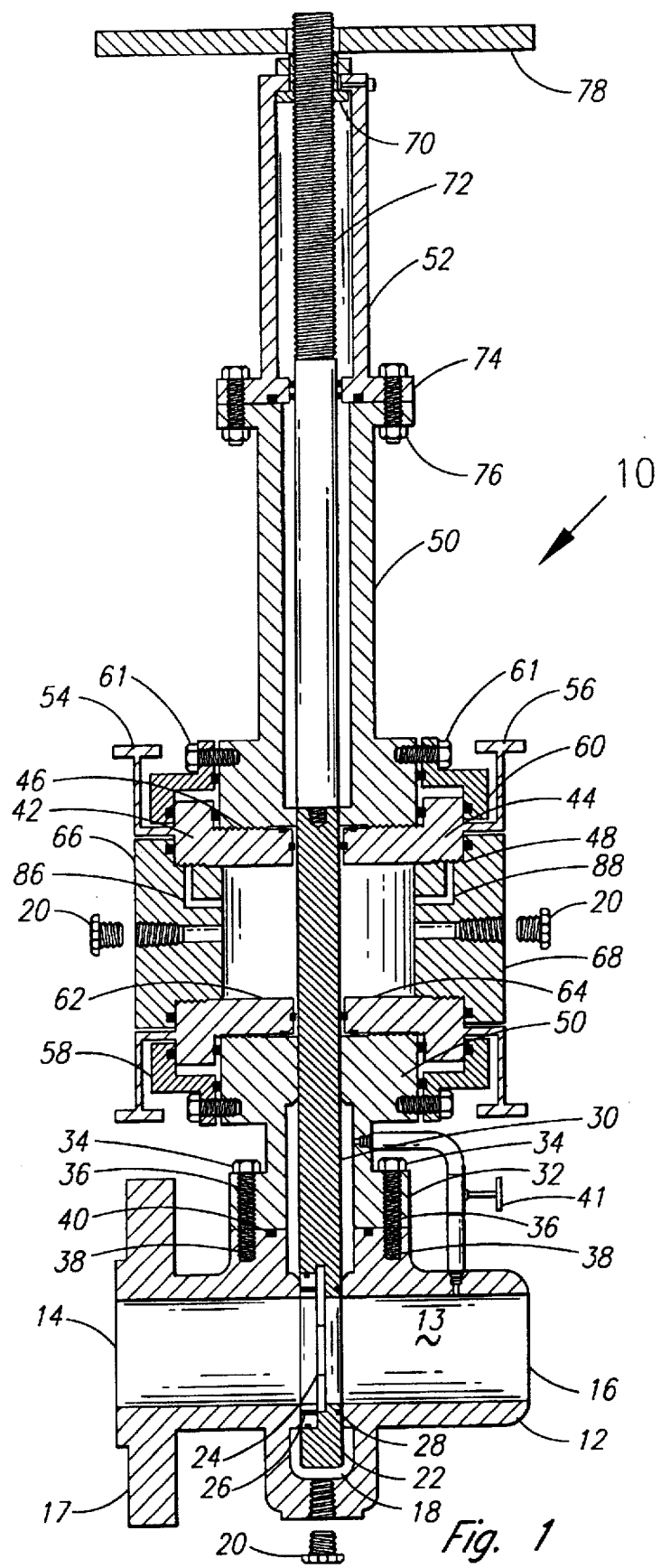
FIG. 1 is a sectional view of an orifice fitting for measurement of fluid flow constructed in accordance with the present invention.

Referring to the drawings in detail, FIG. 1 illustrates a sectional view of an orifice fitting 10 for measurement of fluid flow therethrough constructed in accordance with the present invention. The orifice fitting includes an orifice body lower chamber 12. The lower chamber has a tubular opening 13 and a pair of open ends 14 and 16 which would be connected to a pipeline or other system (not shown) for fluid flow therethrough. The ends 14 and 16 will be connected by known connection means, such as flange 17. Additionally, the ends 14 and 16 would be in communication with pressure measurement instrumentation (not shown) so that the pressure drop is determined.

The lower chamber 12 includes a receptacle 18 which is transverse to the fluid flow through the pipeline. One end of the opening 18 may be sealed by a threaded bottom plug 20 (shown exploded for clarity).

The lower chamber 12 may be integral with the orifice fitting or may be an existing, simplex or single chamber fitting that is converted into a duplex or double chamber fitting by the teachings of the present invention.

Received within the receptacle 18 is an orifice plate carrier 22 which extends across and is parallel with the diameter of the tubular opening 13 through the lower chamber 12. FIG. 1 is a depiction of the plate carrier 22 in the operational or flow-through position. In the flow-through position shown in FIG. 1, the fluid flow will be blocked from passing through the fitting 10 with the exception of an orifice in an orifice plate 24 held by the carrier 22.

Also included on the plate carrier 22 are carrier plate seals 26 and 28 which extend from the opposed faces of the plate carrier. The carrier plate seals 26 and 28 mate with the lower chamber 12 at the receptacle 18 to form a fluid-tight seal between the plate carrier 22 and the lower chamber 12. Accordingly, when in use, no fluid flow is permitted except through the ends 14 and 16 of the fitting 10.

The orifice plate carrier 22 has a carrier extension 30 which extends radially from the tubular opening 13. The carrier extension 30 is received in and travels in an orifice body upper chamber 32.

The upper body chamber 32 may be permanently affixed to the lower chamber or, as shown in FIG. 1, may be secured by fasteners such as bolts 34 which pass through openings 36 in the upper chamber and are received in threaded openings 38 in the lower chamber. A gasket or gaskets 40 assists in assuring a fluid-tight seal between the upper and lower chambers. It will be observed that a simplex fitting that has a lower chamber 12 may thus be converted to a duplex fitting.

An optional pressure equalization valve 41 may be provided between the upper and lower chamber.

The upper chamber 32 includes a pair of opposed seal rings 42 and 44. Each of the seal rings 42 and 44 has external threads 46 and 48, respectively, which engage a bonnet 50. The seal rings 42 and 44 each have extending handles 54 and 56 in order to rotate the rings. Each seal ring thus may be independently tightened or loosened.

Each seal ring 42 and 44 has a seal ring retainer 58 and 60, respectively, which is fastened to the bonnet 50 by cap screws 61.

Each seal ring 42 and 44 has an internally threaded cavity 62 and 64, respectively, in which is received an access or entry plug 66 and 68 having external threads.

The carrier extension 30 terminates in a stem nut 70 which threadably engages a stem screw 72. The stem screw 72 is sealed within both the bonnet and a stem yoke body 52 by holder 74 and fasteners 76.

The stem screw 72 passes through the holder 74 and terminates in a screw handle 78 so that rotation of the handle rotates the screw.

Figure 2:
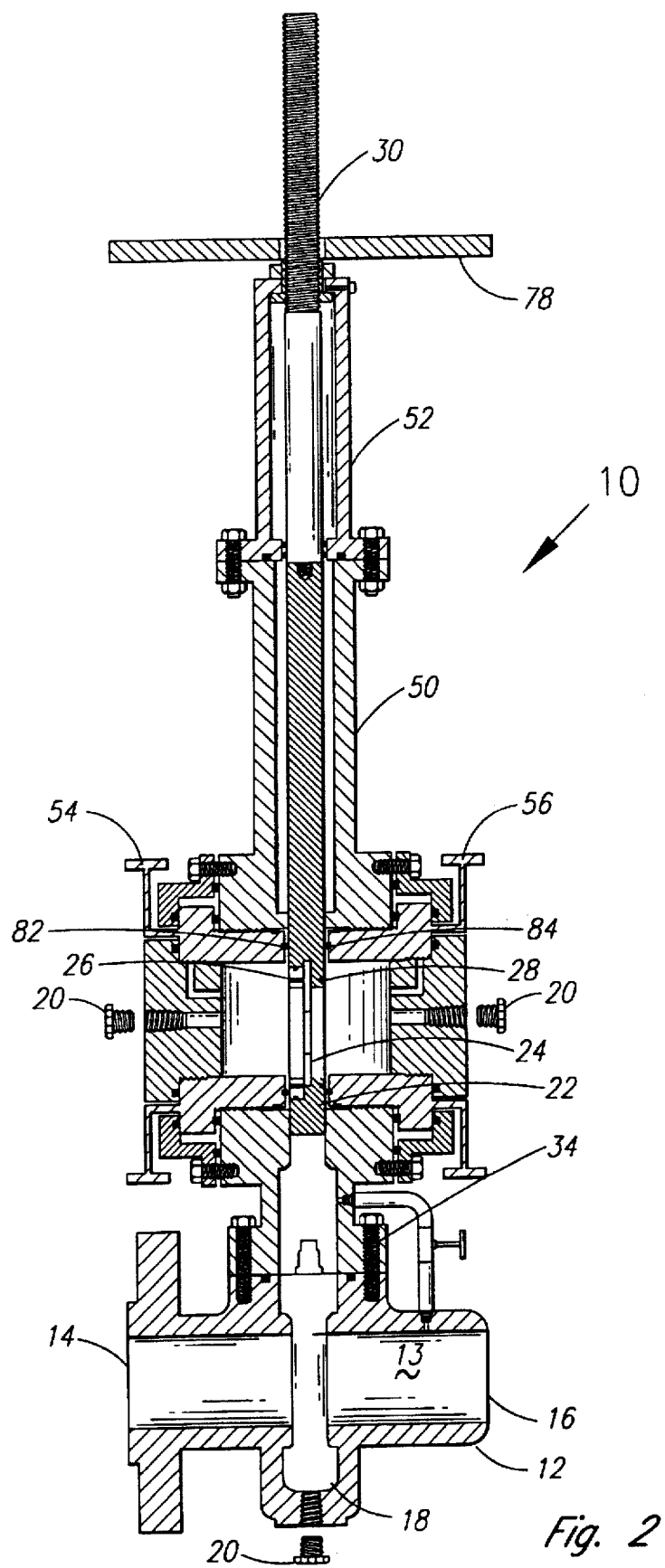
FIG. 2 is a sectional view of the orifice fitting shown in FIG. 1 with its plate carrier moved into an upper chamber.

The orifice plate carrier 22 and its associated plate and seals are movable between the lower chamber 12, as shown in FIG. 1, and the upper chamber, as shown in the sectional view in FIG. 2.

As the stem screw 72 is rotated by rotation of the handle 78, the stem nut will ascend toward the handle and away from the lower chamber 12. Accordingly, the carrier extension 30 will also move and the plate carrier 22 will be raised out of the receptacle 18 and upward into the upper body chamber 32. Once the plate carrier is removed from the lower chamber, fluid flow will pass freely through the tubular opening 13. Continued rotation of the handle 78 will cause the carrier to be raised into the cavities 62 and 64 formed by the seal rings.

Once the carrier is fully raised adjacent the cavities of the seal rings 42 and 44, each seal ring can be independently tightened against the plate carrier 22. As best seen in FIG. 2, seal ring gaskets 82 and 84 extend from the seal rings and assist in maintaining the seal between the faces of the plate carrier and the seal rings. After the seal rings have been tightened against the carrier, no fluid flow from the lower chamber or from the fluid system itself will be permitted into the cavities 62 and 64.

Thereafter, at least one entry plug may be unscrewed partially from its seal ring. Each entry plug includes a bleed hole 86 and 88. Each bleed hole communicates with the cavity of the upper chamber. Accordingly, any pressurized fluid in the cavity of the upper chamber 32 will quickly dissipate. If continued fluid flow is observed through the bleed hole, the operator (not shown) will be alerted that a problem exists so that the entry plug may be retightened and sealed and other action, such as terminating the fluid flow through the fitting, may be taken. At least one entry plug may also be provided with an opening to receive an optional pressure measurement device to monitor the pressure in the cavities locally or remotely.

The entry plugs also provide a mechanism to detect leakage between the carrier plate and the lower chamber when in the operational position shown in FIG. 1. To utilize this leakage detection mechanism, the equalization valve must be closed. At least one entry plug may be unscrewed partially from its seal ring. If continued fluid flow exists, a problem with the carrier plate seals 26 or 28 is present.

Returning to a consideration of FIG. 2, it will be observed that when the carrier 22 is in the cavities 62 and 64 of the seal rings, the entire orifice plate 24 along with each of the carrier plate seals 26 and 28 are fully accessible. The cavities have a larger diameter than the plate and the carrier seals. By removing the entry plugs 66 and 68, full access is provided to both sides of the plate carrier and both sides of the orifice plate 24. While maintenance and service is provided on the carrier and its accompanying plate and seals, fluid flow may continue through the lower chamber so that fluid flow through the system is not interrupted. The present fitting 10 is also easily adaptable to mechanized procedures wherein the stem handle is replaced by an external motor or other device to rotate the stem screw.

To return the orifice plate 24 to the operational position, the reverse procedure is performed. The entry plugs 66 and 68 are replaced by threading into the seal rings. Thereafter, each of the seal rings is rotated to loosen the fluid-tight connection between the seal rings and the carrier. Once the seal rings have been disengaged from the carrier, the screw handle 78 may be rotated in order to move the carrier downward back into the operational or flow-through position shown in FIG. 1.

The seal rings 42 and 44 will tighten in the opposite or counterclockwise direction than normal. Thus, when an entry plug is unscrewed by turning counterclockwise, it will tend to tighten the seal ring.

Figure 3:
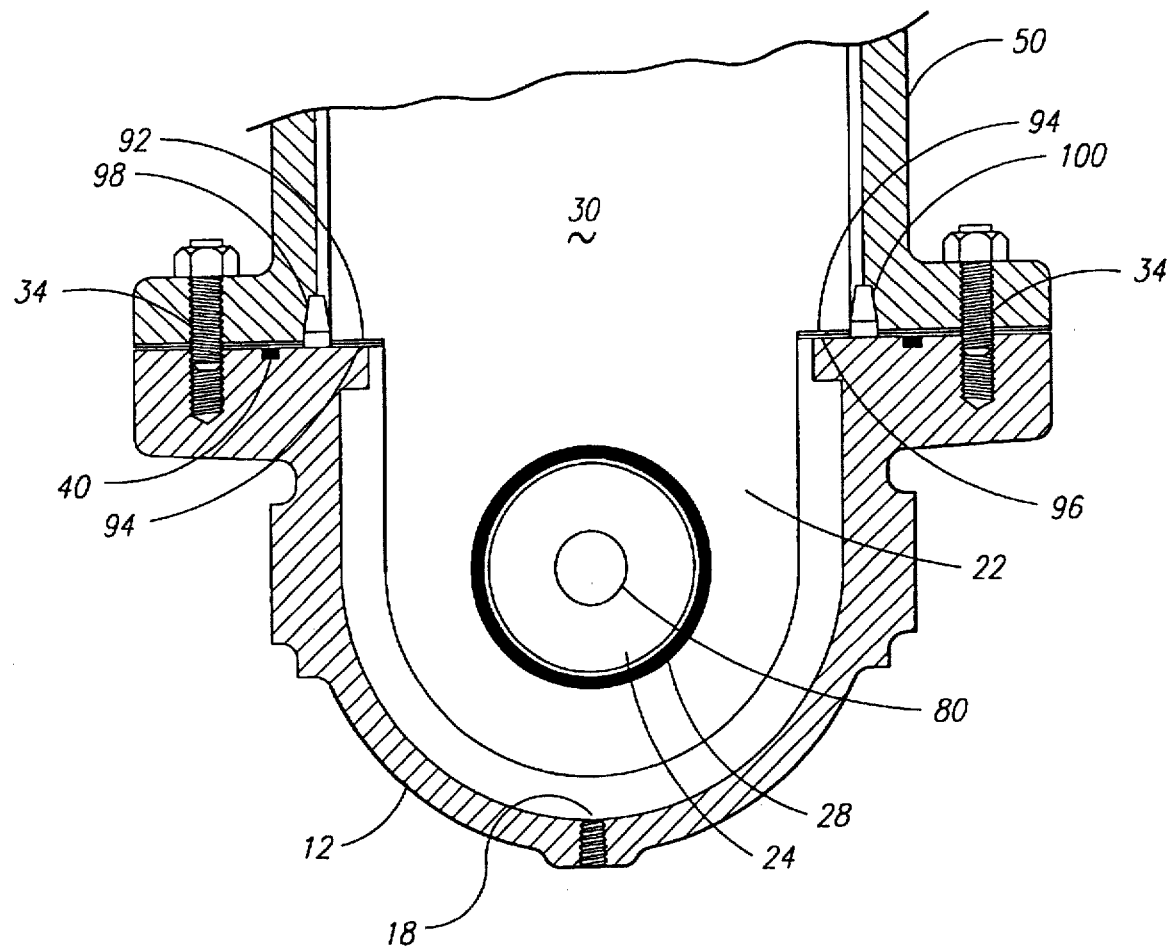
FIG. 3 is a partial sectional view of the lower chamber of the orifice fitting as shown in FIG. 1.

FIG. 3 is a partial sectional view of the lower chamber 12 of the orifice fitting 10 with the carrier 22 in the operational position as shown in FIG. 1. The orifice opening 88 in the carrier plate 24 is visible. The carrier plate seal 26 which extends from the face of the plate carrier 22 surrounds the plate 24.

It is important to properly concentrically align the orifice opening 80 in the lower chamber. Provisions for both horizontal and vertical alignment are provided in the present invention. The plate carrier 22, or the carrier extension 30, is provided with edges 90 and 92 that will rest on ledges 94 and 96. Accordingly, the plate 24 is vertically aligned in the lower chamber.

A pair of tapered alignment pins 98 and 100 extend from the lower chamber 12 or the bonnet 50 of the upper body. As the carrier 22 and extension 30 descend toward the lower chamber, the alignment pins will engage the carrier or the extension in order to horizontally align the plate and its orifice in the lower chamber.

It will be appreciated that the operation of the stem screw 72 may be motorized by a motor to replace manual rotation of the handle 78.

Figure 4A:
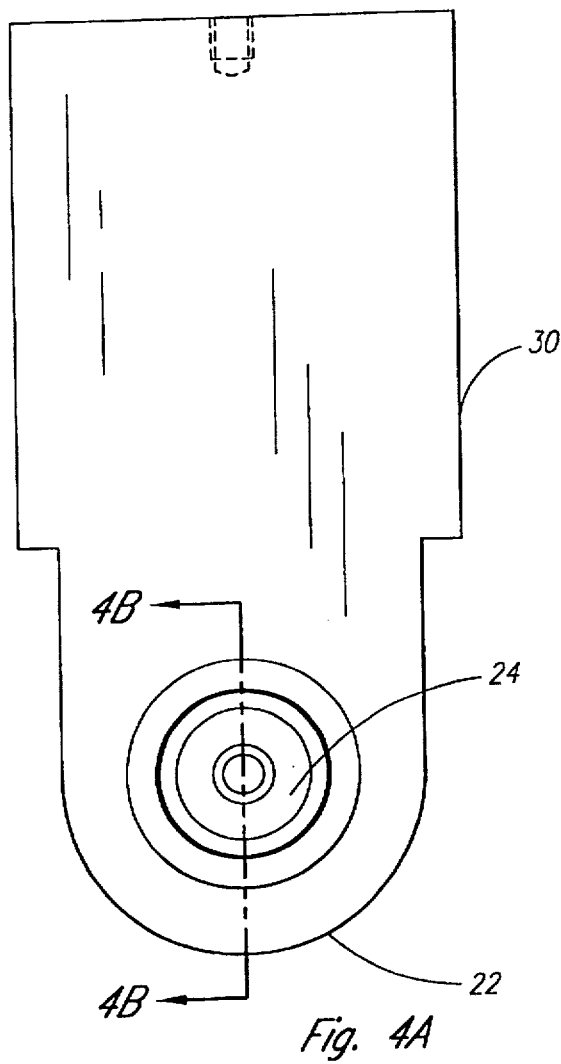
FIGS. 4a and 4b are an enlarged carrier plate and a standard orifice plate for the fitting shown in Figure :L.
Figure 4B:
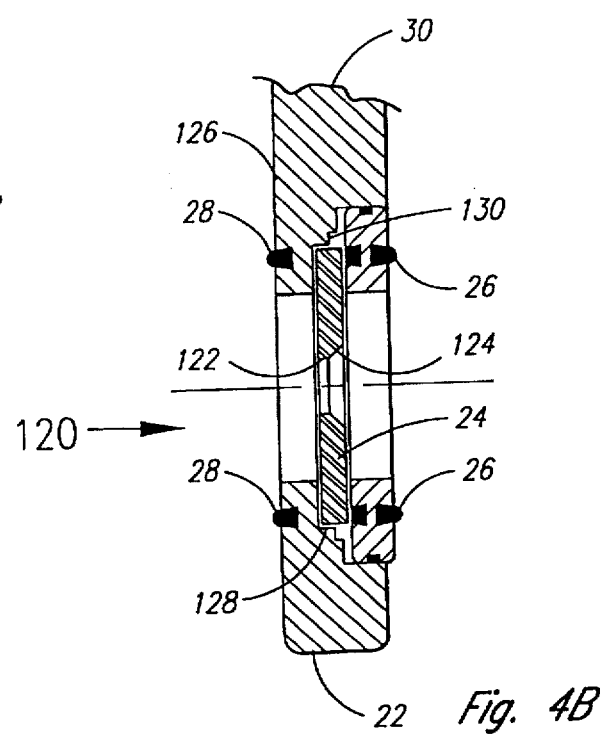

FIGS. 4A and 4B show an enlarged standard orifice plate 24 and an enlarged carrier 22 for receipt of the orifice plate 24. The orifice plate 24 illustrated in FIGS. 4A and 4B is of the standard design, being a flat circular disk having a pair of opposed faces with an opening for fluid flow. The orifice plate 24 has a preferred fluid flow direction illustrated by arrow 120.

The orifice plate includes a central opening 122 having a chamfered or beveled edge 124 on the outlet side which influences the fluid dynamics and the fluid measurement.

The plate carrier 22 includes a double circular shoulder 126 having a first shoulder 128 and a concentric second shoulder 130 having a larger diameter than the first shoulder 128. In the embodiment shown in FIGS. 4A and 4B, the outside diameter of the standard orifice plate 24 is slightly less than the diameter of the first shoulder 128 so that the orifice plate 24 fits therein. A standard orifice plate will, thus, be received in the plate carrier.

Figure 5A:
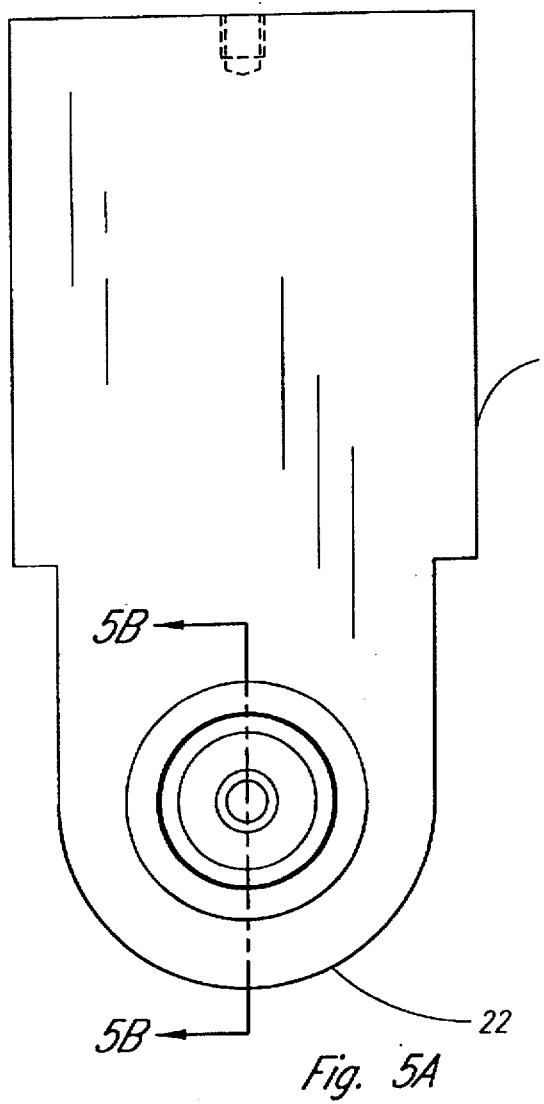
FIGS. 5a and 5b are an enlarged carrier plate and a unidirectional orifice plate for the fitting shown in FIG. 1.
Figure 5B:
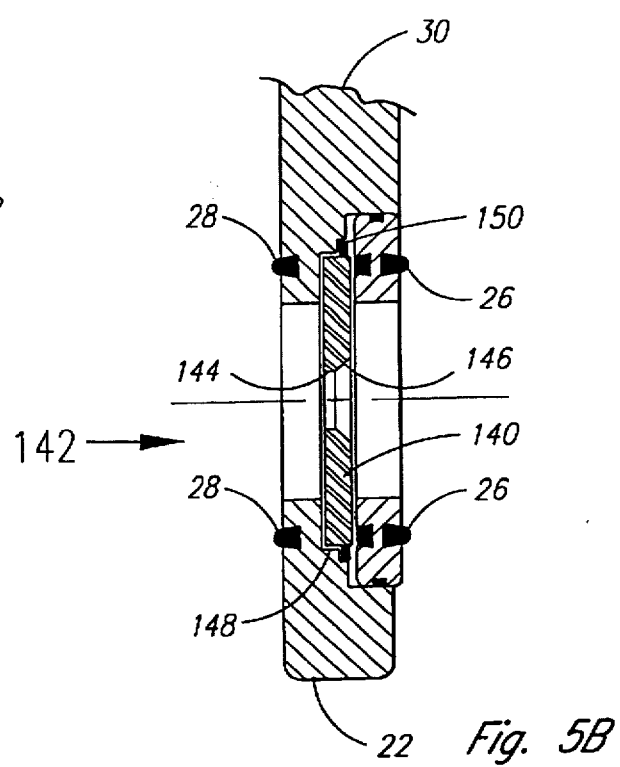

FIGS. 5A and 5B show the enlarged plate carrier 22 shown in FIGS. 4A and 4B with an alternate, enlarged orifice plate 140. The preferred fluid flow direction is shown by arrow 142.

The orifice plate 140 includes a central opening 144 having a chamfered or beveled edge 146 on the outlet side which influences the fluid dynamics and the fluid measurement. The orifice plate 140 is a cylindrical disk having a pair of opposed faces. A first edge portion 148 with a first diameter mates with the first shoulder 128 of the plate carrier. A second concentric edge portion 150 with a larger diameter than the first portion mates with the second shoulder 130 of the carrier. The second edge portion 150 of the orifice plate will not fit within the first shoulder of the plate carrier. Accordingly, the plate can only be installed in one preferred direction.

It will be appreciated that the orifice plate 140 in FIGS. 5A and 5B might be utilized in either a single, junior or a dual, senior chamber fitting.

Figure 6A:
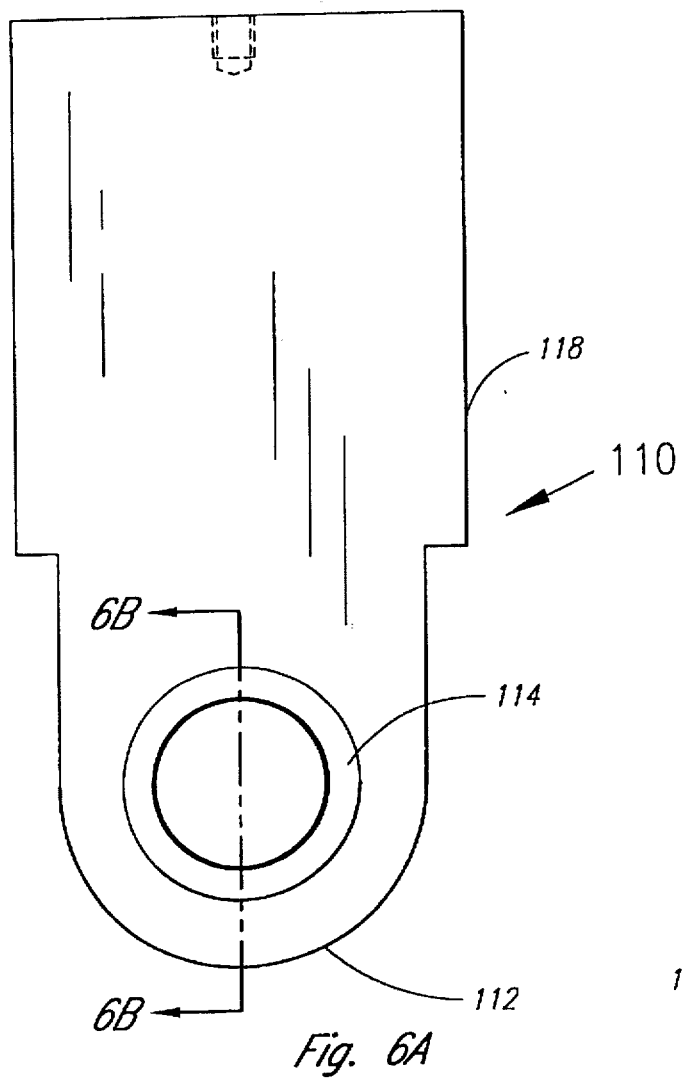
FIGS. 6a and 6b illustrate an alternate embodiment of the present invention.
Figure 6B:
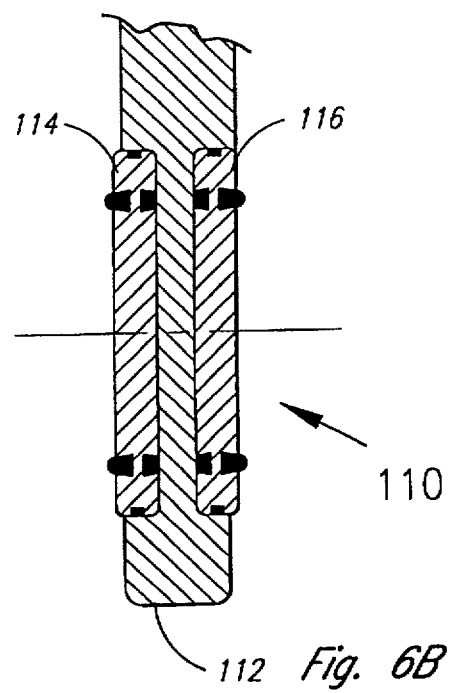

FIGS. 6A and 6B illustrate a further alternate embodiment 110 wherein the teachings of the present invention are employed in a gate valve for controlling fluid flow through a pipeline or other fluid system. Rather than an orifice plate, a solid, flat plate 112 is employed with plate seals 114 and is on each opposed face. A valve body lower chamber (not seen in FIG. 6A or 6B) is provided for receipt of the plate therein. When the plate is in the lower chamber, the seals may join with the lower chamber to form a fluid-tight seal.

A separate valve body upper chamber also is capable of receiving the plate. The plate has a carrier extension 118 which extends radially from the lower chamber. The upper chamber includes a pair of opposed seal rings, each of which is independently tightenable against the plate.

The plate seals 114 and 116 may be fabricated from replaceable teflon rings or discs which project out from the surface of the plate. Accordingly, when the plate is in the lower chamber, there is no metal-to-metal contact in the closed position.

It will be appreciated that the orifice fitting embodiment shown in FIGS. 1 through 5 may be converted to a gate valve embodiment as shown in FIGS. 6A and 6B by replacing the orifice plate with a closed plate.

Whereas, the present invention has been described in relation to the drawings attached hereto, it should be understood that other and further modifications, apart from those shown or suggested herein, may be made within the spirit and scope of this invention.

What is claimed is:

1. An orifice fitting for measurement of fluid flow therethrough, which fitting comprises:

a plate carrier having an orifice plate receivable in said plate carrier, said plate having a single preferred fluid flow direction;

a double circular shoulder in said plate carrier including a first shoulder and a concentric second shoulder having a larger diameter than said first shoulder; and said plate having a first portion with a first diameter and a second concentric portion with a larger diameter than said first portion, said first plate portion mating with and resting on said first shoulder of said plate carrier and said second plate portion mating with and resting on said second shoulder of said plate carrier, so that said orifice plate can only be installed in one direction to properly orient said plate for said preferred fluid flow direction.

2. An orifice fitting for measurement of fluid flow therethrough, which fitting comprises:

a plate carrier having an orifice plate and carrier plate seals, said plate carrier movable between an orifice body lower chamber and an orifice body upper chamber, wherein said plate carrier has a double circular shoulder including a first shoulder and a concentric second shoulder having a larger diameter than said first shoulder;

said plate having a first portion with a first diameter and a second concentric portion with a larger diameter than said first portion, wherein said plate portion mates with said first shoulder and said second plate portion mates with said second shoulder to properly orient said plate in a preferred fluid flow direction;

means to seal said upper body chamber to said plate carrier to produce a fluid-tight seal between said upper body chamber and carrier and between said upper and lower chambers; and means to allow access to said plate carrier, to said orifice plate and to said carrier plate seals while said plate carrier is in said upper chamber without interrupting or disabling fluid flow through said lower chamber.

3. An orifice fitting for measurement of fluid flow therethrough as set forth in claim 2 wherein said plate carrier has two opposed sides and said fitting includes two entry plugs to allow access to both sides of said plate carrier.

\* \* \* \* \*